Aug. 13, 1968 MAMORU TSUNAZAWA 3,396,690
POWER TRANSMISSION FOR AN AMPHIBIOUS VEHICLE
Filed Oct. 4, 1966
FIG. 1
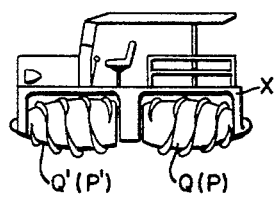
FIG. 2
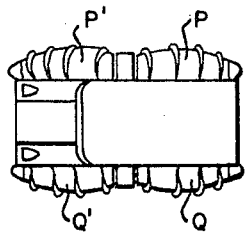
FIG. 3
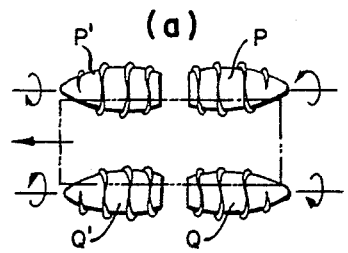
(a)
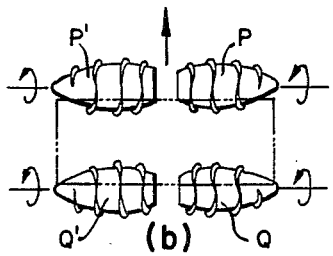
(b)
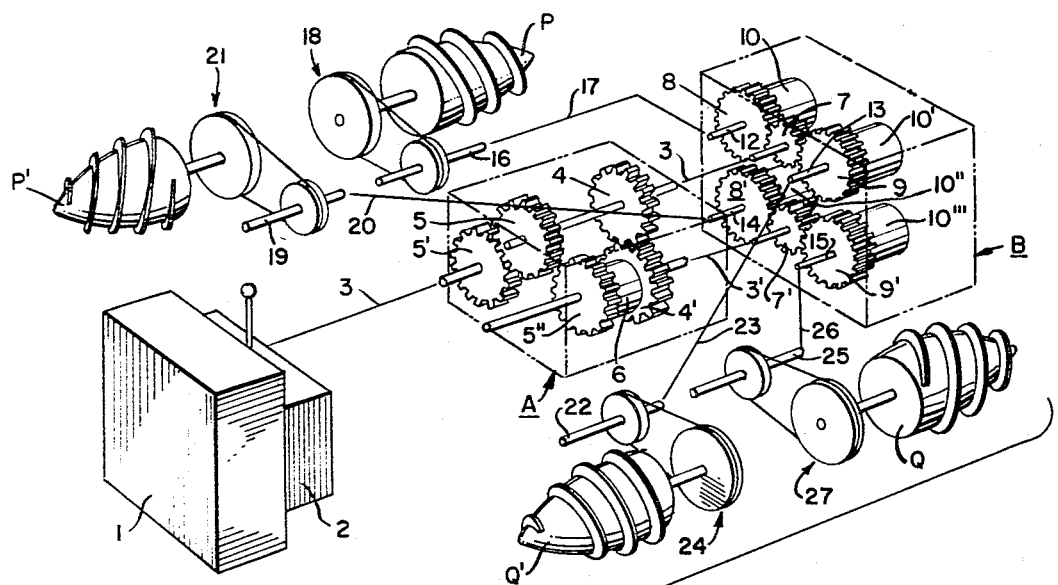
FIG. 4
INVENTOR
MAMORU TSUNAZAWA
BY Nolte & Nolte
ATTORNEYS United States Patent Office 3,396,690
Patented Aug. 13, 1968

3,396,690
POWER TRANSMISSION FOR AN
AMPHIBIOUS VEHICLE
Mamoru Tsunazawa, Tokyo-to, Japan, assignor to Ishikawajima-Harima Jukogyo Kabushiki Kaisha, Tokyo-to, Japan, a company of Japan
Filed Oct. 4, 1966, Ser. No. 584,185
Claims priority, application Japan, May 10, 1966, 41/43,195
1 Claim. (Cl. 115—1)

ABSTRACT OF THE DISCLOSURE

This specification discloses an amphibious vehicle including four screw rotors located at the four corners of the vehicle and driving connections for rotating each rotor independently of the others and in reverse directions. Each pair of diagonally disposed rotors constitute a set and each rotor includes a helical fin. The helices of the fin of one set are wound oppositely to the helices of the other set.

The present invention is related to power transmission for an amphibious vehicle.

In an amphibious vehicle which has two screw rotors in the fore and the other two in the rear, since those screw rotors must be independently rotated in any direction for forward or transverse movement, and also since those screw rotors in the inner side in turning of the said vehicle must be stopped in rotation, the structure of the power transmission device for each screw rotor is usually very complicated. However, the amphibious vehicle requires, in nature, the structure of power transmission to be: (1) light and, (2) simple.

The purpose of the present invention is to provide a power transmission device which meets the above mentioned requirements. Following is the explanation of an embodiment of the present invention with reference to the attached drawings.

FIG. 1 is a front view of an amphibious vehicle provided with the device of the present invention, FIG. 2 is a ground plan of the said vehicle, FIG. 3 is a ground plan explaining the relationship between the direction of progress of the said vehicle and the direction of rotation of each rotor of the said vehicle, and FIG. 4 is a perspective view of an embodiment of the present device.

In the drawings, a vehicle chassis is shown at X 1 refers to the prime mover, 2 to the transmission which changes the speed of drive shaft and 3 to the drive shaft. In the midway of the said drive shaft 3, there is installed a gearing power distributor A for rotating another drive shaft 3' which is in parallel with above mentioned drive shaft 3 in the same or opposite direction with same speed relative to the rotation of the latter. The gearing distributor A is comprised of the drive shaft 3, a toothed wheel 4 fixed on the said drive shaft, drive shaft 3, another drive shaft 3', another toothed wheel 4' which engages with the said gear 4 and slides on the said drive shaft 3', a pinion 5 fixed on the drive shaft 3, an intermediate toothed wheel 5', another gear 5" which engages the said pinion 5 through the said intermediate gear 5' and slides on the said drive shaft 3', and a clutch 6 also slidable on the shaft 3, wherein either one on the toothed wheels 4' and 5" is to be coupled with the drive shaft 3' by switching the said clutch 6.

A pinion 7 is drivably carried by the shaft 3. This pinion meshes with gears 8 and 9 that are normally freely rotatable on shafts 12 and 13. A clutch 10 is adapted to drivably connect the gear 8 to the shaft 12 while another clutch 10' is operable to establish the driving relation between the gear 9 and the shaft 13.

Another pinion 7' is drivably mounted on the shaft 3'. It meshes with the gears 8' and 9'. The gear 8' rotates on a shaft 14 and is adapted to be drivably connected thereto by clutch 10''. The gear 9' is rotatable on a shaft 15 and the driving relation between the two is established by clutch 10'''.

The shaft 12 is operably connected to a shaft 16 as indicated by the line 17 (FIG. 4). A pulley and drive belt assembly indicated in its entirety at 18 operatively connects the shaft 16 to a screw rotor P. The shaft 14 is operably connected to a shaft 19 as is noted by the line 20. A pulley and drive belt assembly such as depicted at 21, or a comparable mechanism, operatively connects the shaft 19 to a screw rotor P'.

The shaft 13 is connected to a shaft 22 by connections represented by the line 23 and a pulley and drive belt assembly 24 connects the shaft 22 to a screw rotor Q'. The shaft 15 is connected to shaft 25 by connections represented by the line 26. Pulley and belt assembly 27 connects the shaft 26 to a screw rotor Q.

It is evident that the clutch 6 provides for reversing the direction of rotation of the shaft 3' relative to the direction of rotation of the shaft 3. The clutches 10, 10', 10'' and 10''' enable the operator to selectively bring into operation any of the screw rotors P, P', Q and Q'.

Since the present invention device has the above described structure, it has the advantages that the composition is extremely simple and light in weight and that it is possible to drive the amphibious vehicle forward or sidelong at will be shifting the gears of the distributor so as to rotate the diagonal screw rotors in the desired direction, and also to let the vehicle make a turn by independently rotating or stopping each rotor through engaging or disengaging of the clutch of the reduction device.

What I claim is:
1. In an amphibious vehicle, a chassis presenting four corner locations, a screw rotor at each of said locations, each of said rotors having a helical fin providing traction, two of said rotors which are diagonally disposed constituting one set and the other two diagonally disposed rotors constituting another set, the helical fin of one set being wound in a direction opposite to the winding of the fin in the other set, and means for selectively rotating the two sets in the same direction or in opposite directions.

References Cited

UNITED STATES PATENTS

| | | | |
|---|---|---|---|
| 661,427 | 11/1900 | Sibley et al. | 180—3.1 |
| 669,210 | 3/1901 | Burch | 180—7 |
| 1,228,093 | 5/1917 | Burch | 180—3.1 |
| 1,431,440 | 10/1922 | Burch | 180—3.1 |

BENJAMIN HERSH, Primary Examiner.

J. A. PEKAR, Assistant Examiner.